United States Patent
Barber

(10) Patent No.: US 9,915,368 B2
(45) Date of Patent: Mar. 13, 2018

(54) ELECTROHYDRAULIC VALVE HAVING DUAL-ACTION RIGHT-ANGLE PILOT ACTUATOR

(71) Applicant: Caterpillar Inc., Peoria, IL (US)

(72) Inventor: Dennis Ray Barber, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 32 days.

(21) Appl. No.: 14/934,591

(22) Filed: Nov. 6, 2015

(65) Prior Publication Data

US 2017/0130857 A1    May 11, 2017

(51) Int. Cl.
| | |
|---|---|
| F16K 31/06 | (2006.01) |
| F16K 11/06 | (2006.01) |
| F16K 27/04 | (2006.01) |
| E02F 9/00 | (2006.01) |

(52) U.S. Cl.
CPC ............. *F16K 31/061* (2013.01); *E02F 9/00* (2013.01); *F16K 11/06* (2013.01); *F16K 27/04* (2013.01); *Y10T 137/8671* (2015.04); *Y10T 137/86606* (2015.04); *Y10T 137/86614* (2015.04)

(58) Field of Classification Search
CPC ..... Y10T 137/86614; Y10T 137/86606; Y10T 137/87241; Y10T 137/8671; E02F 9/00; F15B 13/0402; F15B 13/043; F15B 13/0433; F15B 13/0435; F16K 31/061; F16K 31/0613; F16K 11/06; F16K 11/065; F16K 11/07; F16K 27/04; F16K 27/041
USPC ..... 91/374, 447, 464, 382, 368; 137/625.64, 137/625.63, 596.2, 625.69
See application file for complete search history.

(56) References Cited

U.S. PATENT DOCUMENTS

| | | | | |
|---|---|---|---|---|
| 2,896,588 A | * | 7/1959 | Hayner | F15B 13/0438 116/DIG. 42 |
| 2,898,936 A | * | 8/1959 | Collins | F16K 31/40 137/625.27 |
| 3,267,965 A | * | 8/1966 | Kroffke | F15B 13/0431 137/625.64 |
| 3,502,109 A | * | 3/1970 | Straight | F15B 13/043 137/625.64 |
| 3,653,409 A | | 4/1972 | Brannon | |
| 3,662,783 A | * | 5/1972 | Stacey | F15B 13/02 137/454.5 |
| 3,875,849 A | * | 4/1975 | Patel | F15B 9/08 137/625.64 |
| 4,011,891 A | * | 3/1977 | Knutson | F15B 9/08 137/625.62 |
| 4,290,447 A | * | 9/1981 | Knutson | F15B 13/0435 137/596.2 |
| 4,456,031 A | | 6/1984 | Taplin | |

(Continued)

*Primary Examiner* — David Colon Morales
(74) *Attorney, Agent, or Firm* — Finnegan, Henderson, Farabow, Garrett & Dunner, LLP

(57) ABSTRACT

A pilot actuator is disclosed for use with a valve. The pilot actuator may have a cage with a base end and a tip end, and a pilot bore formed in the cage. The pilot actuator may also have a supply port, a drain port, a first end port, and a second end port each formed in the cage and intersecting with the pilot bore. The pilot actuator may further have a pilot spool slidingly disposed in the pilot bore and movable to selectively connect the supply port and the drain port with the first and second end ports, a follower separate from the cage and disposed at the tip end of the cage, and at least one spring operatively connecting the follower to the cage and to the pilot spool.

13 Claims, 3 Drawing Sheets

(56) References Cited

U.S. PATENT DOCUMENTS

| | | | | |
|---|---|---|---|---|
| 4,543,875 A * | 10/1985 | Imhof | ............ | F15B 13/0402 |
| | | | | 137/625.63 |
| 4,567,914 A * | 2/1986 | Coppola | ............ | F15B 13/0405 |
| | | | | 137/625.27 |
| 4,569,273 A * | 2/1986 | Anderson | ............ | F15B 13/0435 |
| | | | | 137/596.2 |
| 4,741,364 A * | 5/1988 | Stoss | ............ | F15B 13/0402 |
| | | | | 137/625.6 |
| 5,042,832 A * | 8/1991 | Takahashi | ............ | B60G 17/018 |
| | | | | 137/625.64 |
| 5,240,041 A | 8/1993 | Garnjost | | |
| 6,039,077 A | 3/2000 | Schulze | | |
| 6,481,463 B1 | 11/2002 | Harms | | |
| 6,637,461 B2 | 10/2003 | Post | | |
| 6,904,937 B2 * | 6/2005 | Fischer | ............ | F01L 1/34 |
| | | | | 137/625.64 |
| 7,415,989 B2 * | 8/2008 | Barber | ............ | F15B 13/0402 |
| | | | | 137/596.12 |
| 7,422,033 B2 | 9/2008 | Barber | | |
| 7,487,707 B2 * | 2/2009 | Pfaff | ............ | F15B 11/003 |
| | | | | 91/437 |
| 8,430,125 B2 * | 4/2013 | Massie | ............ | F16K 27/003 |
| | | | | 137/613 |
| 8,453,678 B2 * | 6/2013 | Neff | ............ | F16K 11/07 |
| | | | | 137/625.27 |
| 8,479,768 B2 | 7/2013 | Kunz et al. | | |
| 2003/0006729 A1 | 1/2003 | Raymond | | |
| 2005/0139273 A1 * | 6/2005 | Morselli | ............ | F16K 31/0613 |
| | | | | 137/625.64 |
| 2008/0017261 A1 | 1/2008 | Harms et al. | | |
| 2009/0301588 A1 * | 12/2009 | Shimizu | ............ | F16H 61/0021 |
| | | | | 137/625.64 |
| 2011/0017321 A1 | 1/2011 | Kunz et al. | | |
| 2017/0130745 A1 | 5/2017 | Barber | | |
| 2017/0130864 A1 | 5/2017 | Barber et al. | | |

* cited by examiner

ELECTROHYDRAULIC VALVE HAVING DUAL-ACTION RIGHT-ANGLE PILOT ACTUATOR

TECHNICAL FIELD

The present disclosure relates generally to a valve and, more particularly, to an electrohydraulic valve having a dual-action, right-angle pilot actuator.

BACKGROUND

Hydraulic machines such as dozers, loaders, excavators, backhoes, motor graders, and other types of heavy equipment use one or more hydraulic actuators to accomplish a variety of tasks. These actuators are fluidly connected to a pump of the machine that provides pressurized fluid to chambers within the actuators, and also connected to a sump of the machine that receives low-pressure fluid discharged from the chambers of the actuators. As the fluid moves through the chambers, the pressure of the fluid acts on hydraulic surfaces of the chambers to affect movement of the actuators. A flow rate of fluid through the actuators corresponds to a velocity of the actuators, while a pressure differential across the actuators corresponds to a force of the actuators.

Control over the speed and/or force of hydraulic actuators can be provided by way of one or more metering valves. For example, a first metering valve controls fluid flow into a head-end of a hydraulic cylinder, while a second metering valve controls fluid flow out of the head-end. Likewise, a third metering valve controls fluid flow into a rod-end of the hydraulic cylinder, while a fourth metering valve controls fluid flow out of the rod-end. The different metering valves are cooperatively opened and closed (e.g., based on operator input) to cause fluid to flow into one end of the hydraulic cylinder and simultaneously out of an opposing end, thereby extending or retracting the hydraulic cylinder.

A conventional metering valve includes a body having a bore that receives a spool, and two or more passages formed in the body that communicate with each other via the spool. The spool is generally cylindrical, and includes lands that extend outward away from the body on either side of a valley or annular groove. When the lands are positioned at one or more entrances of the passages, the spool is in a flow-blocking position. When the spool is moved to a flow-passing position, the valley bridges the entrances such that fluid communication between the passages is established via the valley.

Conventional valves can be massive and require a significant amount of energy to move them quickly between the flow-blocking and flow-passing positions. For this reason, pilot valves are often connected to opposing ends of the spool, and function to selectively communicate pressurized pilot fluid with the spool ends. The pilot fluid functions to urge the spool between positions. Using multiple pilot valves, however, can be expensive and consume a large amount of space in the associated valve block.

One attempt to address the issues discussed above is disclosed in U.S. Pat. No. 7,422,033 (the '033 patent) by Barber that issued on Sep. 9, 2008. In particular, the '033 patent discloses a valve assembly having a control spool, a centering spring located at a first end, and a single pilot valve located at a second end of the control spool. The pilot valve includes a tubular sleeve, a pilot spool slidably received within the sleeve, and a dual-action stepper motor connected to move the pilot spool. The sleeve has a projection that engages a piston connected to an end of the control spool. The stepper motor is selectively actuated in one of two different directions to move the pilot spool in opposing directions. As the pilot spool slides within the sleeve, opposing sides of the piston are fluidly connected with either a tank pressure or a supply pressure, thereby causing the control spool to move. As the control spool moves, the sleeve of the pilot valve riding on the piston also moves to provide position feedback to the pilot valve.

Although the valve assembly of the '033 patent may benefit from having only a single control valve and a dual-action stepper motor, the valve assembly may still be complex, expensive, and bulky. Specifically, the use of the piston and sleeve may increase a component count, component cost, and assembly difficulty. Further, the valve assembly may lack adequate force feedback, and the in-line location of the piston and spring at opposing ends of the control spool may increase a length of the valve assembly. In addition, the stepper motor used in the '033 patent may lack the durability required for some applications.

The disclosed valve and pilot actuator are directed to overcoming one or more of the problems set forth above and/or other problems of the prior art.

SUMMARY

One aspect of the present disclosure is directed to a pilot actuator for a valve. The pilot actuator may include a cage with a base end and a tip end, and a pilot bore formed in the cage. The pilot actuator may also include a supply port formed in the cage and intersecting with the pilot bore, a drain port formed in the cage and intersecting with the pilot bore, a first end port formed in the cage and intersecting with the pilot bore, and a second end port formed in the cage and intersecting with the pilot bore. The pilot actuator may further include a pilot spool slidingly disposed in the pilot bore and movable to selectively connect the supply port and the drain port with the first and second end ports, a follower separate from the cage and disposed at the tip end of the cage, and at least one spring operatively connecting the follower to the cage and to the pilot spool.

Another aspect of the present disclosure is directed to a valve. The valve may include a valve body, and a central bore formed in the valve body. The valve may further include an actuator passage formed in the valve body and intersecting with the central bore, and at least one of a supply passage and a drain passage formed in the valve body and intersecting with the central bore. The valve may also include a control spool slidingly disposed in the central bore and movable to selectively connect the actuator passage and the at least one of the supply passage and the drain passage. The control spool may have a base end and a tip end. The valve may additionally include a pilot actuator located at the tip end of the control spool. The pilot actuator may be operable to selectively direct pressurized fluid to one of the base end and the tip end of the control spool and to receive mechanical force feedback from the tip end.

Another aspect of the present disclosure is directed to a hydraulic circuit. The hydraulic circuit may include an actuator, a primary pump, a pilot pump, a sump, and a valve disposed between the actuator, the primary pump, and the sump. The valve may include a valve body, and a central bore formed in the valve body. The valve may also include an actuator passage formed in the valve body and intersecting with the central bore, at least one of a supply passage and a drain passage formed in the valve body and intersecting with the central bore, and a control spool slidingly disposed in the central bore. The control spool may be movable to selectively connect the actuator passage and the at least one of the supply passage and the drain passage. The control spool may have a base end and a tip end with a tapered outer surface. The valve may also include a spring located at the tip end of the control spool and configured to center the control spool within the central bore, and a dual-action pilot actuator located at the tip end of the control spool. The dual-action pilot actuator may be operable to selectively direct pilot fluid to one of the base end and the tip end of the control spool, to selectively direct fluid from a remaining one of the base end and the tip end to the sump, and to receive mechanical force feedback from the tapered outer surface at the tip end of the control spool.

DETAILED DESCRIPTION

Figure 1:
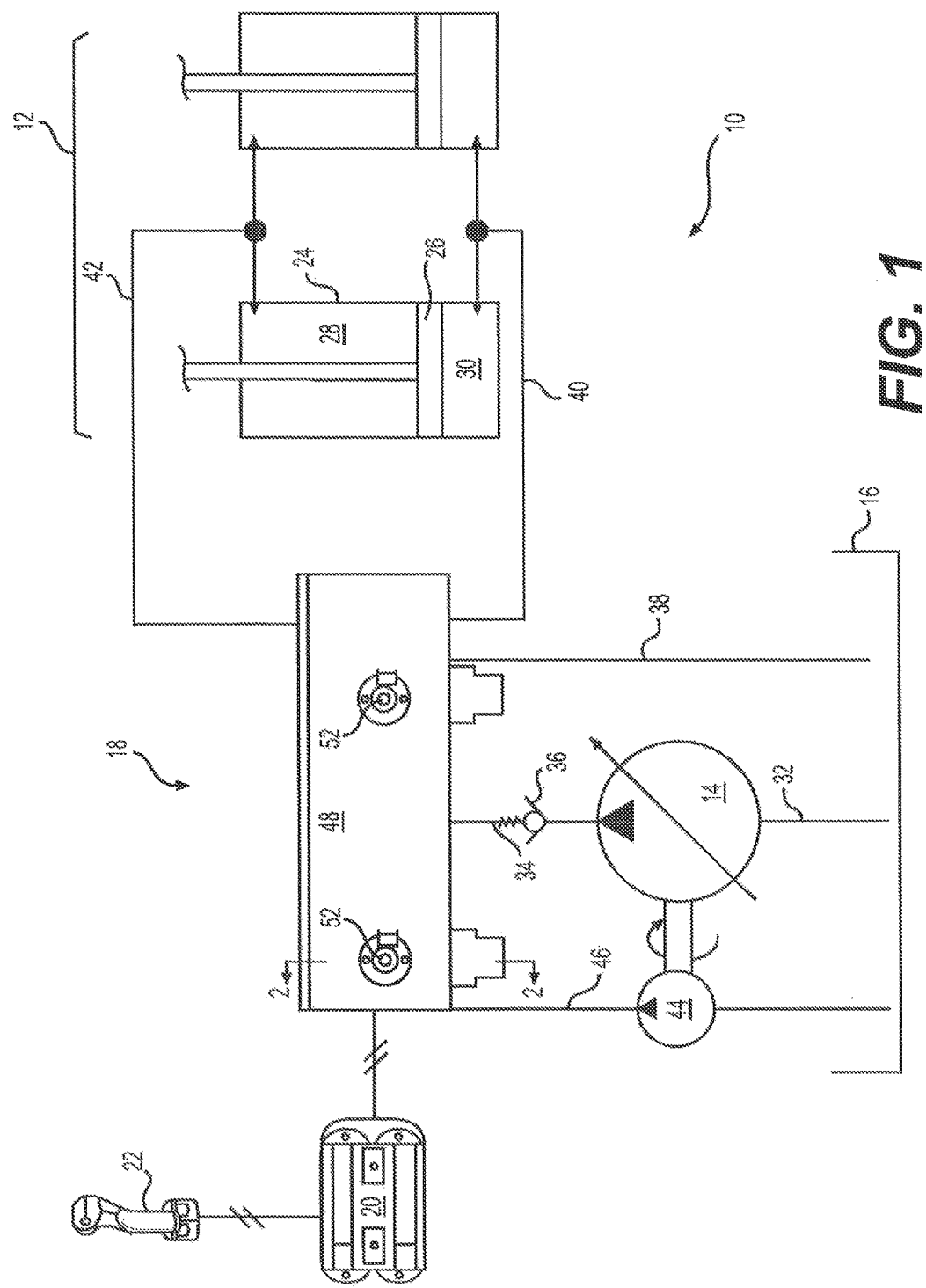
FIG. 1 is a diagrammatic illustration of an exemplary disclosed hydraulic circuit.

FIG. 1 illustrates an exemplary hydraulic circuit 10 having at least one tool actuator 12 that is movable based on input received from an operator. In the disclosed embodiment, two actuators 12 are shown that are arranged to operate in tandem. These tool actuators 12 are linear actuators (e.g., cylinders) that are commonly used to raise and lower the boom of a construction machine (e.g., an excavator—not shown). It is contemplated, however, that any number of tool actuators 12 can be included in hydraulic circuit 10, and embody linear or rotary actuators, as desired. Hydraulic circuit 10 may further include a pump 14 configured to draw low-pressure fluid from a sump 16, to pressurize the fluid, and to direct the pressurized fluid through a valve 18 to tool actuators 12. Valve 18, as will be described in more detail below, may be selectively energized by a controller 20 in response to operator input received via an interface device 22 to regulate a flow direction, a flow rate, and/or a pressure of fluid communicated with tool actuators 12.

Tool actuators 12, as hydraulic cylinders, may each include a tube 24 and a piston assembly 26 arranged within tube 24 to form a first chamber 28 and an opposing second chamber 30. In one example, a rod portion of piston assembly 26 may extend through an end of first chamber 28. As such, first chamber 28 may be considered the rod-end chamber of tool actuator 12, while second chamber 30 may be considered the head-end chamber. Chambers 28, 30 may each be selectively supplied with pressurized fluid and drained of the pressurized fluid to cause piston assembly 26 to displace within tube 24, thereby changing an effective length of tool actuator 12.

It should be noted that, in embodiments where tool actuator 12 is a rotary actuator, the configuration and operation of tool actuator 12 would be similar to that described above for a linear actuator. For example, as a hydraulic motor, tool actuator 12 would include two chambers separated by an impeller. One of these chambers would be selectively supplied with pressurized fluid, while the remaining chamber would be drained of fluid to thereby generate a pressure differential that causes the impeller to rotate. The particular chamber filled with fluid or drained of fluid may dictate the rotational direction of the actuator, while the pressure differential and flow rate may dictate the actuation force and speed, respectively.

Pump 14 may be fluidly connected to sump 16 by way of suction passage 32, and to valve 18 via a pressure passage 34. In some embodiments, a check valve 36 may be disposed in pressure passage 34 to help ensure a unidirectional flow of fluid from pump 14 to valve 18. Pump 14 may be any type of pump known in the art, for example a fixed or variable displacement piston pump, gear pump, or centrifugal pump. Pump 14 may be driven by an engine, by an electric motor, or by another suitable power source.

Sump 16 may be connected to valve 18 via a drain passage 38. Sump 16 may constitute a reservoir configured to hold the low-pressure supply of fluid. The fluid may include, for example, a dedicated hydraulic oil, an engine lubrication oil, a transmission lubrication oil, or any other fluid known in the art. One or more hydraulic circuits may draw fluid from and return fluid to sump 16. It is contemplated that hydraulic circuit 10 can be connected to multiple separate sumps 16 or to a single sump 16, as desired. A relief valve (not shown) can be associated with drain passage 38 to help maintain a desired pressure within hydraulic circuit 10.

Valve 18 may fluidly communicate with tool actuators 12 via head- and rod-end passages 40, 42; and selective pressurization of passages 40, 42 may cause desired actuator movements. For example, to retract tool actuators 12, rod-end passage 42 may be filled with fluid pressurized by pump 14 (i.e., passage 42 may be connected with passage 34), while head-end passage 40 may be drained of fluid (i.e., passage 40 may be connected with passage 38). In contrast, to extend tool actuators 12, head-end passage 40 may be filed with fluid pressurized by pump 14, while rod-end passage 42 may be drained of fluid. As will be described in more detail below, valve 18 may facilitate these connections.

In the disclosed example, valve 18 is electro-hydraulically operated. Specifically, valve 18 may be selectively energized to cause associated elements to move between different positions that generate corresponding pilot signals (i.e., flows of pilot fluid). The pilot fluid may flow from a pilot pump 44 through a pilot passage 46 to valve 18, and cause the connections described above to be made.

Figure 2:
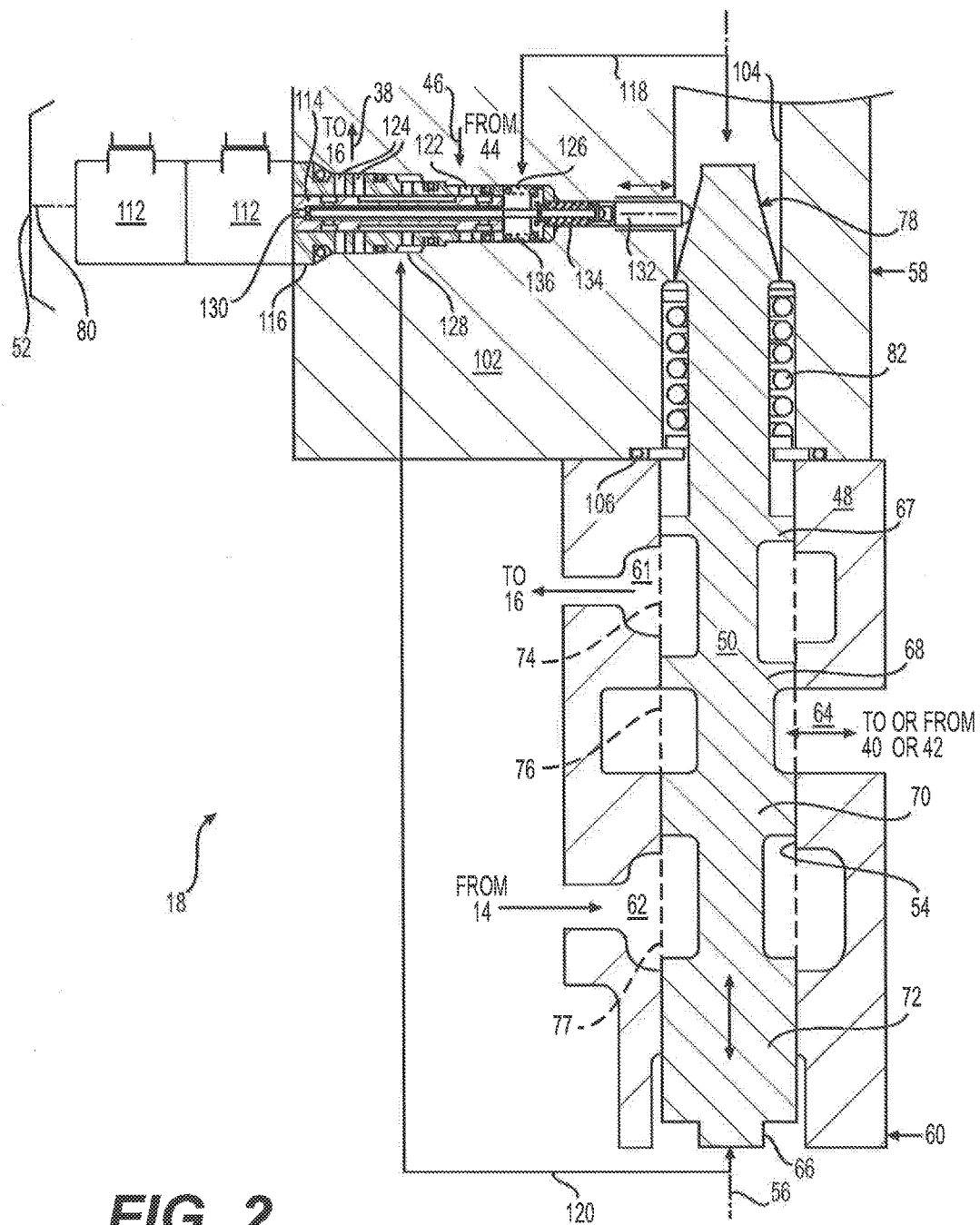
FIG. 2 is a cross-sectional illustration of an exemplary disclosed valve that may be used in conjunction with the hydraulic circuit of FIG. 1.

As shown in FIG. 2, valve 18 may consist of at least three primary components, including a valve block 48, a control spool 50 disposed in valve block 48, and a valve actuator 52 mounted to valve block 48 and configured to cause axial movement of control spool 50 within valve block 48. It should be noted that FIG. 2 illustrates only one exemplary embodiment of valve 18 that can be used to control fluid communication with either of head-end or rod-end passages 40, 42. In particular, the embodiment of valve 18 shown in FIG. 2 can be associated with only the head-end of tool actuator 12 or only the rod-end, and can function to control supply fluid to and from tool actuator 12. Accordingly, hydraulic circuit 10 (referring to FIG. 1) can have two of the same valves 18 that are shown in FIG. 2 to provide for the full functionality of tool actuators 12 or, alternatively, hydraulic circuit 10 can have the one valve 18 shown in FIG. 2 and one or more other valves that are not shown. In the disclosed embodiment, valve 18 includes a single common valve block 48 (see FIG. 1), as well as two separate control spools 50 and two separate valve actuators 52 that are connected to the same valve block 48. In other embodiments, however, each control spool 50 and valve actuator 52 can be associated with a separate valve block 48. If multiple valve blocks 48 are included, they may be bolted together or connected to each other via external conduits.

Valve block 48 may have a bore 54 formed therein for each control spool 50 that is housed in valve block 48. Bore 54 may have a central axis 56, and extend from a first end 58 to a second end 60 along central axis 56. A first passage 61 may be formed adjacent first end 58 that intersects with (i.e., is in fluid communication with) bore 54, a second passage 62 may be formed adjacent second end 60 that also intersects with bore 54, and a third passage 64 may be formed between first and second passages 61, 62 that also intersects with bore 54. In general, first, second, and third passages 61, 62, 63, 64 may be oriented within valve block 48 generally orthogonal to central axis 56, and spaced apart from each other in an axial direction of bore 54. In the disclosed embodiment, bore 54 may be enlarged at each of passages 61, 62, 63, 64 such that, when control spool 50 is disposed inside of bore 54, each of passages 61, 62, 63, 64 may communicate with an entire periphery of control spool 50 at the enlarged locations.

Control spool 50 may be movable inside bore 54 along axis 56 to selectively connect or block fluid flow between passages 61, 62, 63, 64. In particular, control spool 50 may include, among other things, an elongated cylindrical body ("body") 66, and a plurality of lands (e.g., four lands 67, 68, 70 and 72) that protrude radially out past an outer surface of body 66. Body 66 may be configured to slide in an axial direction relative to block 48 and, as will be explained in more detail below, the sliding movement of body 66 may either block or fluidly communicate passages 61, 62, 63, 64 with each other by way of lands 67, 68, 70 and 72. In one embodiment, a radial clearance between an outer surface of lands 67, 68, 70 and 72 and an inner surface of bore 54 may be small enough to inhibit fluid leakage. In other embodiments, however, one or more of lands 67, 68, 70 and 72 may include an annular seal (not shown) to inhibit the leakage.

Lands 67, 68, 70 and 72 may each be configured to divide and/or isolate axial spaces inside bore 54. For example, lands 67 and 68 may be located adjacent each other to thereby define an isolated space 74 (a.k.a., a valley or annular groove) therebetween. Similarly, lands 68 and 70 may be located adjacent each other to thereby define an isolated space 76 therebetween. Finally, lands 70 and 72 may be located adjacent each other to thereby define an isolated space 77 therebetween. When control spool 50 is in a neutral position (shown in FIG. 2), space 74 may be aligned with only passage 61 and land 68 may isolate passage 61 from passage 64. Similarly, when control spool 50 is in the neutral position, space 76 may be aligned with only passage 64 and isolated by lands 67 and 70 from passages 61 and 62. Likewise, when control spool 50 is in the neutral position, space 77 may be aligned with only passage 62 and land 70 may isolate passage 62 from passage 64. However, when control spool 50 is moved to a first actuated position (e.g., upward from the position shown in FIG. 2), space 76 may bridge both of passages 61 and 64, allowing fluid flow therebetween. And when control spool 50 is moved to a second actuated position (e.g., downward from the position shown in FIG. 2), space 76 may bridge both of passages 62 and 64, allowing fluid flow therebetween. Lands 67 and 72 may function to axially limit fluid from flowing out the ends of bore 54.

A centering spring 82 may be located at first end 58 and used to bias control spool 50 towards its neutral position. Centering spring 82 may be a captured-type of spring, wherein both ends of spring 82 are constrained. In this configuration, spring 82 may exert biasing forces on control spool 50 during both compression and tension caused by movement of control spool 50 to the first and second actuated positions.

Body 66 of control spool 50 may include an integral feedback portion 78 located at first end 58 that is used to connect body 66 to actuator 52. In the disclosed example, feedback portion 78 embodies a conical ramp, on which a portion of valve actuator 52 rides during axial movement of control spool 50. The ramp contour of feedback portion 78 may be designed to affect the behavior of control spool 50 and, accordingly the conical shape of feedback portion 78 can be consistent and linear, have a varying taper angle along its length, and/or be non-linear in some locations. For example, a terminus of feedback portion 78 can be straight (i.e., cylindrical), as shown in FIG. 2.

As discussed above, valve actuator 52 may be an electro-hydraulic type of actuator configured to cause movement of control spool 50 between its three positions (i.e., the neutral position, the first actuated position, and the second actuated position) when commanded to do so by controller 20 (referring to FIG. 1). As an electro-hydraulic actuator, valve actuator 52 may be selectively energized to communicate pilot signals (e.g., pressure and drain signals) with first or second ends 58, 60 of control spool 50, thereby causing control spool 50 to move in a desired direction away from its neutral position. As will be described in more detail below, as control spool 50 is moved by an imbalance of pressure acting on the ends thereof, the conical ramp of feedback portion 78 may mechanically press against a portion of valve actuator 52 with a force proportional to its movement, thereby providing force feedback to valve actuator 52.

In the exemplary embodiment of FIG. 2, valve actuator 52 includes an actuator housing 102 having a bore 104 formed therein that is generally aligned with bore 54 of valve block 48. Actuator housing 102 may be connected to an end of valve block 48, and a seal (e.g., an o-ring 106) may be located therebetween and around bores 54 and 104. Feedback portion 78 of control spool 50 may extend a distance into bore 104. A primary axis 80 of valve actuator 52 may be oriented generally orthogonal to bore 104 and to axis 56 of body 66. For the purposes of this disclosure, the term "generally" may be considered to mean "within engineering tolerances."

A dual-action solenoid 112 may connect to housing 102 at a side thereof, and be configured to electromagnetically move (e.g., push and pull) a pilot spool 114 within a cage 116 that is aligned with primary axis 80. As pilot spool 114 is moved within cage 116, pilot passage 46 and drain passage 38 may be selectively connected with a first end passage 118 and a second end passage 120 via of one or more ports formed in cage 116 (e.g., via a pressure port 122, a tank port 124, a first end port 126, and a second end port 128). First end passage 118 may extend from port 126 in cage 116 to first end 58 of control spool 50, while second end passage 120 may extend from port 128 in cage 116 to second end 60.

Pilot spool 114 may be connected at a base end to an armature (not shown) of solenoid 112 by way of a pin 130. Pin 130 may extend completely through a hollow center of pilot spool 114 to engage a follower 132 that rides on the conical ramped surface of feedback portion 78. Pin 130 may connect to follower 132 via a captured spring 134. In this configuration, the force feedback provided by feedback portion 78 may be transmitted simultaneously to solenoid 112 and to pilot spool 114. Because spring 134 may be "captured", spring 134 may exert biasing forces on pin 130 during compression and tension caused by relative movement of follower 132 and pin 130. An additional spring 136 may be used to ensure that follower 132 remains in contact with feedback portion 78 throughout operation.

Figure 3:
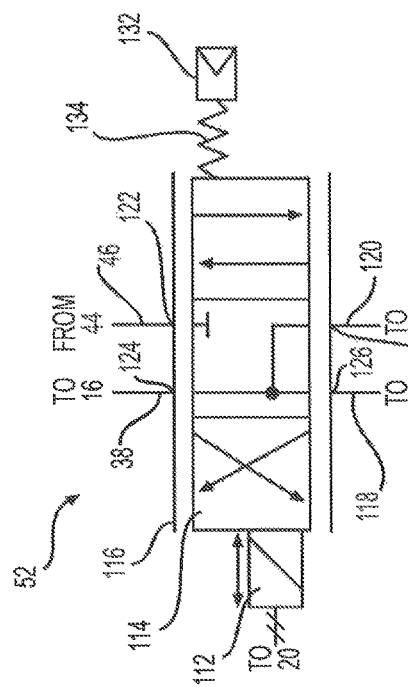
FIGS. 3-5 are schematic representations of a pilot actuator that forms a portion of the valve of FIG. 2, illustrated in three different operating positions.
Figure 4:
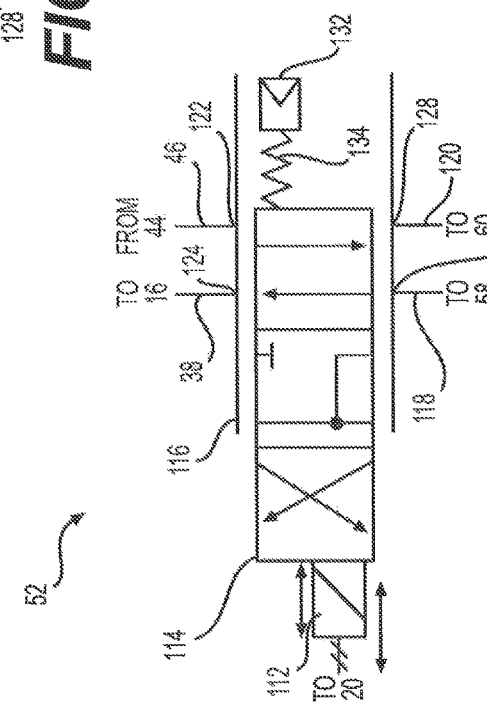
Figure 5:
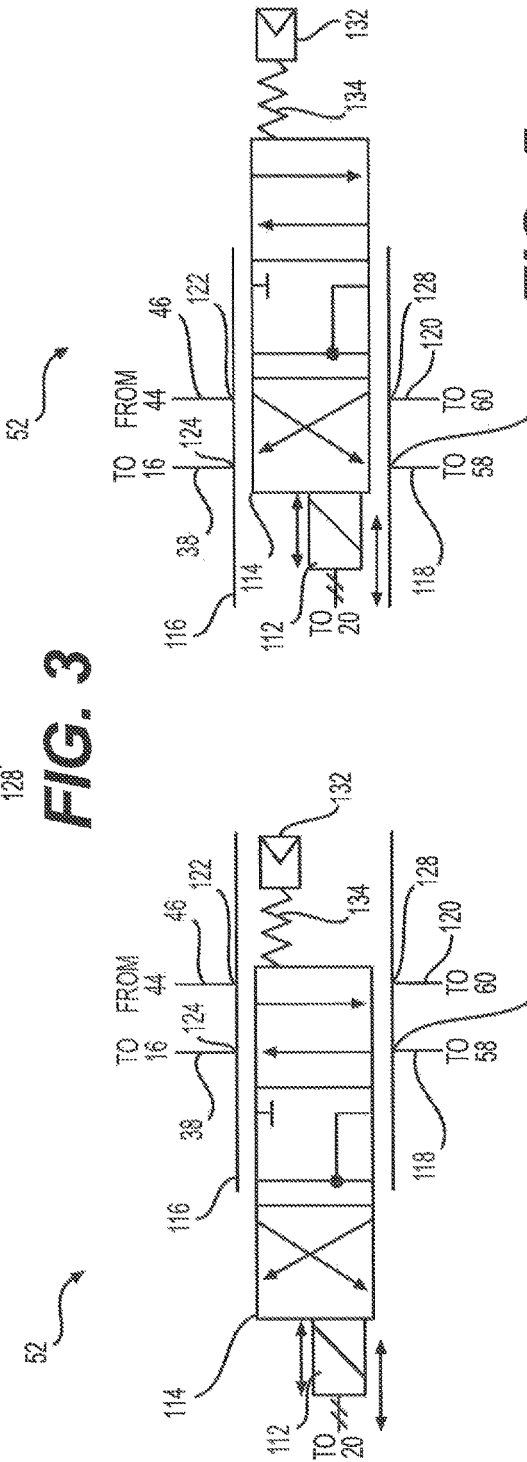

FIGS. 3-5 illustrate valve actuator 52 schematically, in three different operating positions. In particular, FIG. 3 illustrates pilot spool 114 of valve actuator 52 in a neutral position, wherein both of first and second end passages 118, 120 are connected to drain passage 38. In this position, neither of first or second ends 58, 60 of control spool 50 are exposed to an elevated pressure, allowing centering spring 82 to maintain control spool 50 in its neutral position. FIG. 4 illustrates pilot spool 114 being pulled to a first actuation position, wherein second end passage 120 is connected with pilot pump 44 via pilot passage 46, and first end passage 118 is simultaneously connected with sump 16 via drain passage 38. When pilot spool 114 is in this position, second end 60 of control spool 50 may be exposed to a higher pressure fluid than first end 58, causing control spool 50 to move to its first actuated position. FIG. 5 illustrates pilot spool 114 being pushed to a second actuation position, wherein first end passage 118 is connected with pilot pump 44 via pilot passage 46, and second end passage 120 is simultaneously connected with sump 16 via drain passage 38. When pilot spool 114 is in this position, first end 58 of control spool 50 may be exposed to a higher pressure fluid than second end 60, causing control spool 50 to move to its second actuated position.

Controller 20 (referring back to FIG. 1) may embody a single or multiple microprocessors that include a means for monitoring operator input and responsively energizing one or more of valve actuators 52 to affect movement of tool actuator 12. For example, controller 20 may include a memory, a secondary storage device, a clock, and a processor, such as a central processing unit or any other means for accomplishing a task consistent with the present disclosure. Numerous commercially available microprocessors can be configured to perform the functions of controller 20. It should be appreciated that controller 20 can readily embody a general machine controller capable of controlling numerous other machine functions. Various other known circuits may be associated with controller 20, including signal-conditioning circuitry, communication circuitry, and other appropriate circuitry. Controller 20 may be further communicatively coupled with an external computer system, instead of or in addition to including a computer system, as desired.

In some embodiments, controller 20 may rely on sensory information when regulating the flow directions and/or pressures within hydraulic circuit 10. For example, instead of or in addition to the signals generated by interface device 22, controller 20 may communicate with one or more sensors (not shown) to detect actual pressures inside hydraulic circuit 10. These sensors can be mounted in valve block 48 and/or housing 102, if desired. Controller 20 may then automatically adjust flow directions and/or pressures based on the signals generated by the sensors.

Interface device 22 may embody, for example, a single or multi-axis joystick located proximal an operator seat (not shown). Interface device 22 may be a proportional device configured to position and/or orient a work tool (not shown) by producing signals that are indicative of a desired work tool speed and/or force in a particular direction. The position signals may be used by controller 20 to cause corresponding movements of tool actuator 12 (e.g., by selectively energizing actuator 52). It is contemplated that different interface devices 22 may additionally or alternatively be included in hydraulic circuit 10 such as, for example, wheels, knobs, push-pull devices, switches, pedals, and other operator input devices known in the art.

INDUSTRIAL APPLICABILITY

The disclosed valve and actuator may be applicable to any hydraulic circuit. The disclosed valve and actuator may provide high-performance control of a tool actuator in a low-cost, high-performance, small-footprint configuration. Control over movement of tool actuator 12 will now be described in detail with reference to FIGS. 1 and 2.

During operation of hydraulic circuit 10 (referring to FIG. 1), pump 14 may be driven to pressurize fluid. The pressurized fluid may be directed past check valve 36 to valve 18 via pressure passage 34. At this same time, pilot fluid may be pressurized by pilot pump 44 and directed to valve 18 via pilot passage 46. An operator of hydraulic circuit 10 may request movement of tool actuator 12 (e.g., extension or retraction) by manipulating (e.g., tilting) interface device 22 in a corresponding direction by a corresponding amount. Electronic signals generated by interface device 22 may be directed to controller 20, which may responsively energize or de-energize particular valve actuator(s) 52 to achieve the desired tool motion.

During the normal or default state of valve 18, valve actuator 52 may be de-energized. As shown in FIG. 2, when valve actuator 52 is de-energized, the biasing force of spring 82 may function to urge body 66 of control spool 50 toward its centered position, such that all passages 61, 62, 63, 64 may be inhibited from communicating with each other.

When valve actuator 52 is energized to a first state, pilot spool 114 may be pushed inside of the cage 116 toward control spool 50, such that pilot fluid is communicated with second end 60 and fluid is drained away from first end 58. This communication may result in body 66 of control spool 50 moving upward. As body 66 moves upward, space 76 may communicate passage 61 with passage 64. This can result in pressurized fluid flowing into one of head- and rod-end chambers 28 or 30 of tool actuator 12 from pump 14. As body 66 moves further upward, a greater flow area between passages 61 and 64 may be uncovered, allowing for a greater flow rate of fluid being communicated to tool actuator 12 and a corresponding greater velocity of tool actuator 12.

When valve actuator 52 is energized to a second state, pilot spool 114 may be pulled inside of the cage 116 away from control spool 50, such that pilot fluid is communicated with first end 58 and fluid is drained away from second end 60. This communication may result in body 66 of control spool 50 moving downward. As body 66 moves downward, space 76 may communicate passage 62 with passage 64. This can result in pressurized fluid flowing out of the one of head- and rod-end chambers 28 or 30 of tool actuator 12 and into sump 16. As body 66 moves further upward, a greater flow area between passages 62 and 64 may be uncovered, allowing for a greater rate of fluid flowing to tool actuator 12 and a corresponding greater velocity of tool actuator 12.

As control spool 50 is moved away from its neutral position by the imbalance of fluid pressure acting thereon, follower 132 may translate this motion into a feedback force provided to pilot spool 114 and solenoid 112. That is, as long as the imbalance of pressures acts on control spool 50, control spool 50 may continue to move and, in turn, cause an increasing tool actuator speed, until the feedback force of follower 132 (in addition to the centering force of spring 134) is about equal to the force of solenoid 112 acting on pilot spool 114. At this point in time, when the forces acting on pilot spool 114 become about equal, fluid flow through pilot spool 114 may be restricted or even terminated, thereby slowing or even stopping further motion of control spool 50. This results in a steady motion of tool actuator 12.

Several benefits may be associated with the disclosed valve and actuator. In particular, because the disclosed valve may include a control spool with an integral feedback portion, the component count, cost, and assembly difficulty may be low. Further, the disclosed valve and actuator may provide a desired level of force feedback, and the use of a single centering spring at only the feedback end of control spool 50 may decrease a length of the disclosed valve. In addition, the use of solenoid 112 may provide the durability required for most applications.

It will be apparent to those skilled in the art that various modifications and variations can be made to the disclosed valve and actuator. Other embodiments will be apparent to those skilled in the art from consideration of the specification and practice of the disclosed valve and actuator. For example, although control spool 50 is described as being moved by metering fluid into pressure chambers located at opposing ends thereof, the disclosed valve may function is a similar manner by instead metering fluid out of the opposing pressure chambers, if desired. It is intended that the specification and examples be considered as exemplary only, with a true scope being indicated by the following claims and their equivalents.

What is claimed is:

1. A pilot actuator for a valve, comprising:
a cage having a base end and a tip end;
a pilot bore formed in the cage;
a supply port formed in the cage and intersecting with the pilot bore;
a drain port formed in the cage and intersecting with the pilot bore;
a first end port formed in the cage and intersecting with the pilot bore;
a second end port formed in the cage and intersecting with the pilot bore;
a pilot spool slidingly disposed in the pilot bore and movable to selectively connect the supply port and the drain port with the first and second end ports;
a follower separate from the cage and disposed at the tip end of the cage;
a first spring operatively connecting the follower to the cage;
a second spring operatively connecting the follower to the pilot spool; and
a pin connected to an end of the pilot spool and passing through a center of the pilot spool.

2. The pilot actuator of claim 1, wherein the second spring operatively connects the follower to the pin.

3. The pilot actuator of claim 2, wherein the second spring is a captured spring configured to exert force during both compression and tension as the follower moves relative to the pin and the pilot spool.

4. The pilot actuator of claim 1, further including a solenoid located at the base end of the cage and operatively connected to the pilot spool.

5. The pilot actuator of claim 4, wherein the solenoid is configured to push and to pull the pilot spool relative to the cage.

6. The pilot actuator of claim 4, wherein the solenoid is further operatively connected to the follower via the second spring.

7. A valve, comprising:
a valve body;
a central bore formed in the valve body;
an actuator passage formed in the valve body and intersecting with the central bore;
at least one of a supply passage and a drain passage formed in the valve body and intersecting with the central bore;
a control spool slidingly disposed in the central bore and movable to selectively connect the actuator passage and the at least one of the supply passage and the drain passage, the control spool having a base end and a tip end;
a pilot actuator located at the tip end of the control spool, the pilot actuator operable to selectively direct pressurized fluid to one of the base end and the tip end of the control spool and to receive mechanical force feedback from the tip end;
wherein the tip end of the control spool has a tapered outer surface, and the pilot actuator is configured to mechanically engage the tapered outer surface;
wherein the pilot actuator includes:
a cage having a base end and a tip end;
a pilot bore formed in the cage;
a supply port formed in the cage and intersecting with the pilot bore;
a drain port formed in the cage and intersecting with the pilot bore;
a first end port formed in the cage and fluidly communicating the pilot bore with the tip end of the control spool;
a second end port formed in the cage and fluidly communicating the pilot bore with the base end of the control spool;
a pilot spool slidingly disposed in the pilot bore and movable to selectively connect the supply port and the drain port with the first and second end ports;
a follower separate from the cage and disposed at the tip end of the cage, the follower configured to remain in contact with the tapered outer surface of the control spool at the tip end of the control spool;
a first spring operatively connecting the follower to the cage;
a second spring operatively connecting the follower to the pilot spool; and
a pin connected to an end of the pilot spool and passing through a center of the pilot spool.

8. The valve of claim 7, further including a third spring located at the tip end of the control spool and configured to center the control spool within the central bore.

9. The valve of claim 8, wherein the third spring is a captured spring configured to exert force during both compression and tension as the control spool is moved away from a neutral position in opposing directions.

10. The valve of claim 7, wherein the second spring operatively connects the follower to the pin.

11. The valve of claim 10, wherein the second spring is a captured spring configured to exert force during both compression and tension as the follower moves relative to the pin and the pilot spool.

12. The valve of claim 7, wherein the pilot actuator further includes a solenoid located at the base end of the cage and operatively connected to the pilot spool.

13. The valve of claim 12, wherein:
the solenoid is configured to push and to pull the pilot spool relative to the cage; and the solenoid is further operatively connected to the follower via the second spring.

* * * * *